June 7, 1955

E. MERTEN 2,710,070

SEISMIC RECORDING

Filed March 26, 1951

INVENTOR:
EUGEN MERTEN
BY:
HIS ATTORNEY

June 7, 1955 E. MERTEN 2,710,070
SEISMIC RECORDING

Filed March 26, 1951 3 Sheets-Sheet 2

Inventor: Eugen Merten
By: His Attorney

Inventor: Eugen Merten
By: [signature]
His Attorney

United States Patent Office 2,710,070
Patented June 7, 1955

2,710,070

SEISMIC RECORDING

Eugen Merten, Houston, Tex., assignor to Shell Development Company, Emeryville, Calif., a corporation of Delaware Application March 26, 1951, Serial No. 217,541

5 Claims. (Cl. 181—0.5)

This invention pertains to seismic exploration, and relates more particularly to an improved type of exploratory seismic records or seismograms, and to a method of forming such seismograms.

Exploratory seismograms are usually formed by exploding a charge of dynamite at a shot point to produce seismic or ground waves, translating said waves into electrical impulses at a plurality of suitably spaced seismometers or detectors, and recording said impulses on photographic paper or film by means of a recorder. Recorders are normally provided with means whereby a plurality of oscillatory lines or traces, for example, 8, 10, 12, 16, 20, 32 traces or more, each relating to a detector or a group of detectors, can be recorded side by side on a single seismogram.

Depending on the recording method used, the seismograms may be of the variable amplitude type, wherein the record is produced in the form of an oscillatory line whose amplitude of oscillations or "squiggles" is proportional to the intensity of the electric impulses, or of the variable density type, in which the record is produced in the form of a track wherein the density of the light image is proportional to the intensity of said impulses.

Each of these types of records has advantages and drawbacks. Thus, the variable amplitude seismograms are susceptible of rapid and accurate graphical and mathematical analysis and interpretation. They can, however, be reproduced further only by means of photographic duplication, and cannot be reconverted into electrical impulses capable of being analyzed into component parts or displayed any desired number of times by means of reproducers. On the other hand, variable density records, although capable of reconversion into electrical impulses for purposes of subsequent re-creation of their wave forms, are not suitable for purposes of direct inspection, but can be used only through the intermediary of special analyzing devices. Moreover, the production of variable density records cannot be effected by means of conventional seismic apparatus, but requires the use of complex and highly specialized equipment.

The variable amplitude records moreover, even when obtained in accordance with a method of exploration such, for example, as the continuous profiling method, and subsequently properly arranged and grouped, do not give a clear picture permitting an observer to visualize by inspection the underground conditions of the area under survey.

It is, therefore, an object of this invention to provide, as a visual aid in seismic interpretation, a new type of seismic record combining the desirable characteristics of the variable amplitude and of the variable density type records, and a method of producing such records.

It is also an object of this invention to provide a method whereby variable amplitude or variable area type seismic records obtained in the field by means of standard equipment may be translated into variable density records susceptible of being grouped and disposed so as to give a visual picture of the nature and arrangement of underground strata and, if desired, capable of being re-translated back into electrical impulses for repeated subsequent display.

These and other objects of this invention will be understood from the following description, taken with reference to the attached drawings wherein:

Fig. 1 diagrammatically represents an arrangement of seismic exploration apparatus used in continuous profiling;

Figure 4:
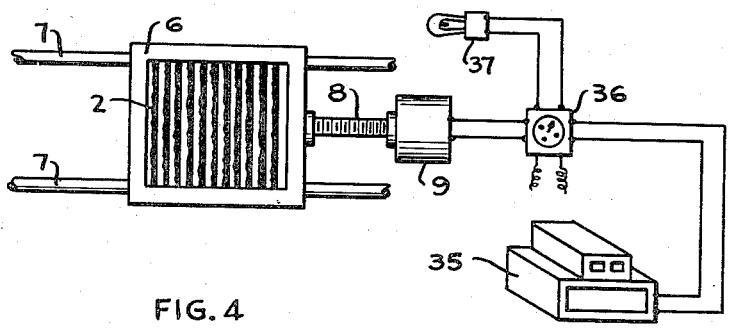
Figure 5:
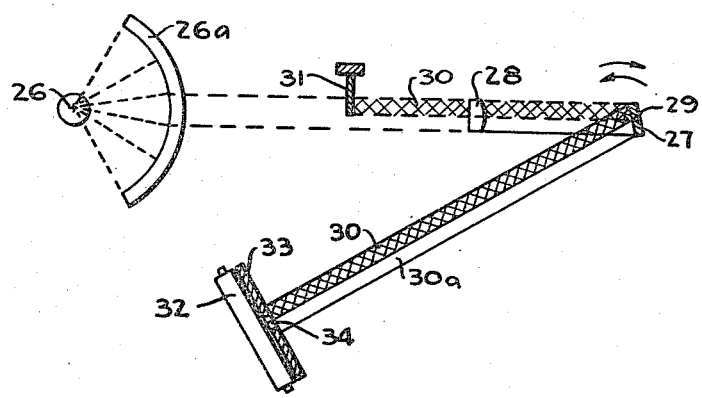

Fig. 4 diagrammatically illustrates a method of transforming variable area seismograms into variable-density seismograms; and Fig. 5 diagrammatically illustrates a method of obtaining contrasting variable-area seismograms.

Figure 1:
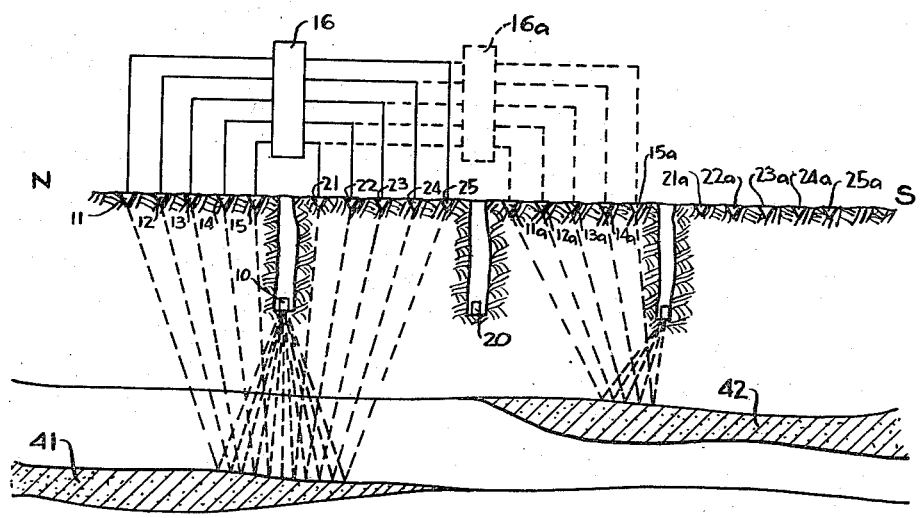

Referring to the drawings, Fig. 1 diagrammatically indicates an arrangement of seismic exploratory and recording apparatus commonly used in seismic profiling work. Disposed along a preferably straight line in contact with the ground is a spread of ten seismometers or detectors of which five, 11 to 15 inclusive, may be located to one side of a shot point 10 and the other five, 21 to 25 inclusive, to the other side thereof. The distance from detector to detector, or from detectors 15 and 21 to the shot point 10, may be of the order of 200 feet, so that the whole spread between seismometers 11 and 25 is about 2,000 feet.

A unit 16, provided with suitable amplifying and recording means, is electrically connected to the detectors to amplify and record in well-known fashion the electrical impulses produced by the detectors upon the arrival thereto of seismic waves generated by an explosion at shot point 10 and reflected or refracted by the various underground formations.

After a shot has been exploded at point 10 and properly recorded, the detectors 11 to 15 are moved to new points 11a to 15a, located to the other side of a new shot point 20, said new detector and shot points extending preferably along the original line of profiling. The recording unit 16 is moved, if desired, to a new location 16a, and the detectors 11a–15a and 21–25 are reconnected thereto as before. After a second shot has been exploded at 20 and recorded, the seismometer spread is moved to further positions 21a—21c along the same line, and a third shot is exploded at a point 30 and recorded as before by the recording unit, which is also moved as needed. In this manner, a continuous profiling of underground formations may be effected along a survey line extending any desired number of feet or miles, the operation being known as continuous profiling.

The type of record obtained at the recording unit 16 may be either of the conventional variable-amplitude type, wherein the vibration of the movable element of the detector in response to ground waves is represented only by a line having a variable amplitude of oscillation, or of the variable area type, wherein the areas to the two sides of the variable amplitude oscillating line appear in contrasting black and white colors. Both of these types of records are suitable as starting material in the method of the present invention, it being understood that should records of the conventional variable amplitude type be obtained in the field, they can be readily converted to contrasting variable-area records of the type shown in Fig. 2 by any desired method, such for example, as applying by hand black ink to the record to one side of the oscillating line photographically produced there.

Should it be desired to obtain contrasting variable area seismic records directly in the field, this can be readily achieved by means of slight modifications of the presently existing recording equipment. By way of illustration, Fig. 5 shows, in diagrammatic plan view, an arrangement wherein the light from a source 26 is condensed, by means of an arcuate condensing lens 26a, on a plurality of galvanometer mirrors, corresponding to the number of channels or seismometers used in a spread. Of these galvanometer mirrors, only one, indicated at 27, is shown on the drawing and will be considered here for purposes of discussion. The light from the source 26, passing through a lens 26a, is focused, in the shape of a flat horizontal light beam 28, on the galvanometer mirror 27. One half of the width of the light beam, as shown at 30, is suppressed by a mask or screen 31. The galvanometer mirror 27 oscillates about a substantially vertical axis 29, being, however, inclined sufficiently to permit the light beam reflected by the mirror 27, to travel toward a photosensitive paper or film unrolled from a drum 32 disposed at a level above or below that of the source 26. A mask 33, having a slit 34 of a width somewhat smaller than that of the light beam reflected by the mirror, is positioned in front of the drum 32 in such a manner that, for the normal or usual position of the galvanometer mirror 27, the boundary between the dark (or suppressed) portion of the beam 30, and the bright portion thereof, indicated at 30a, corresponds to the midpoint of slit 34. It will be obvious from the above that a clockwise or counterclockwise oscillation of the galvanometer mirror about its axis 28 will cause the slit 34 to be swept by the light or the dark (suppressed) portion of the beam, respectively, whereby a record such as shown in Fig. 2 is formed on the sensitized film or paper.

Figure 2:
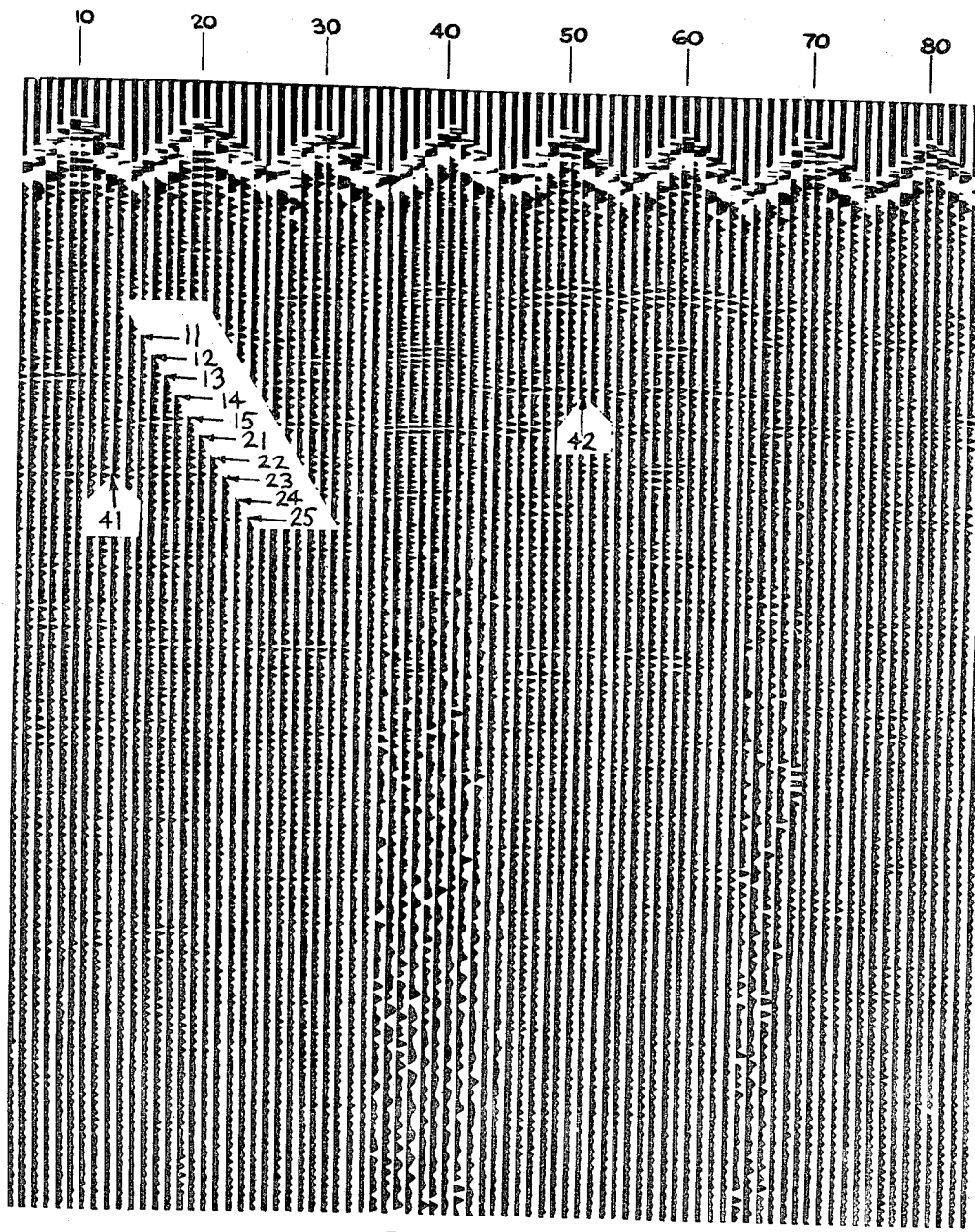
Fig. 2 is a composite variable area seismogram obtained and used for the purposes of this invention.

Fig. 2 illustrates a plurality of variable area records obtained along a profiling line N—S, such as shown in Fig. 1. The traces produced by seismometers 11–15 and 21–25 of Fig. 1 are indicated by the same numerals in Fig. 2, as are also the shot points 10, 20, 30, etc.

In accordance with the present invention, the several multi-trace seismograms obtained as outlined above by exploding successive charges at shot-points 10, 20, 30, etc., are arranged side by side in the form of a single print or photograph, as shown in Fig. 2. It will be seen that the area of Fig. 2 actually gives a cross-section view of the ground along a vertical plane passing through the profiling line N—S of Fig. 1. The various formation layers, and the interfaces therebetween, where the seismic waves traveling from the shot points are partially reflected and partially refracted, are shown on the combined seismogram of Fig. 2 as oscillations appearing along substantially horizontal lines across the successive traces forming said seismogram. Thus, reflecting layers such as diagrammatically shown at 41 and 42 in Fig. 1 may appear as a horizontal row of oscillations going across successive seismograph traces, as also indicated at 41 and 42 in Fig. 2.

It will, however, be seen that although the combined seismogram of Fig. 2 permits, to a certain degree, to visualize underground conditions or stratification along the profiling line, such picture is not very clear and lacks the degree of continuity and sharpness required for instantaneous visualization of underground conditions.

Figure 3:
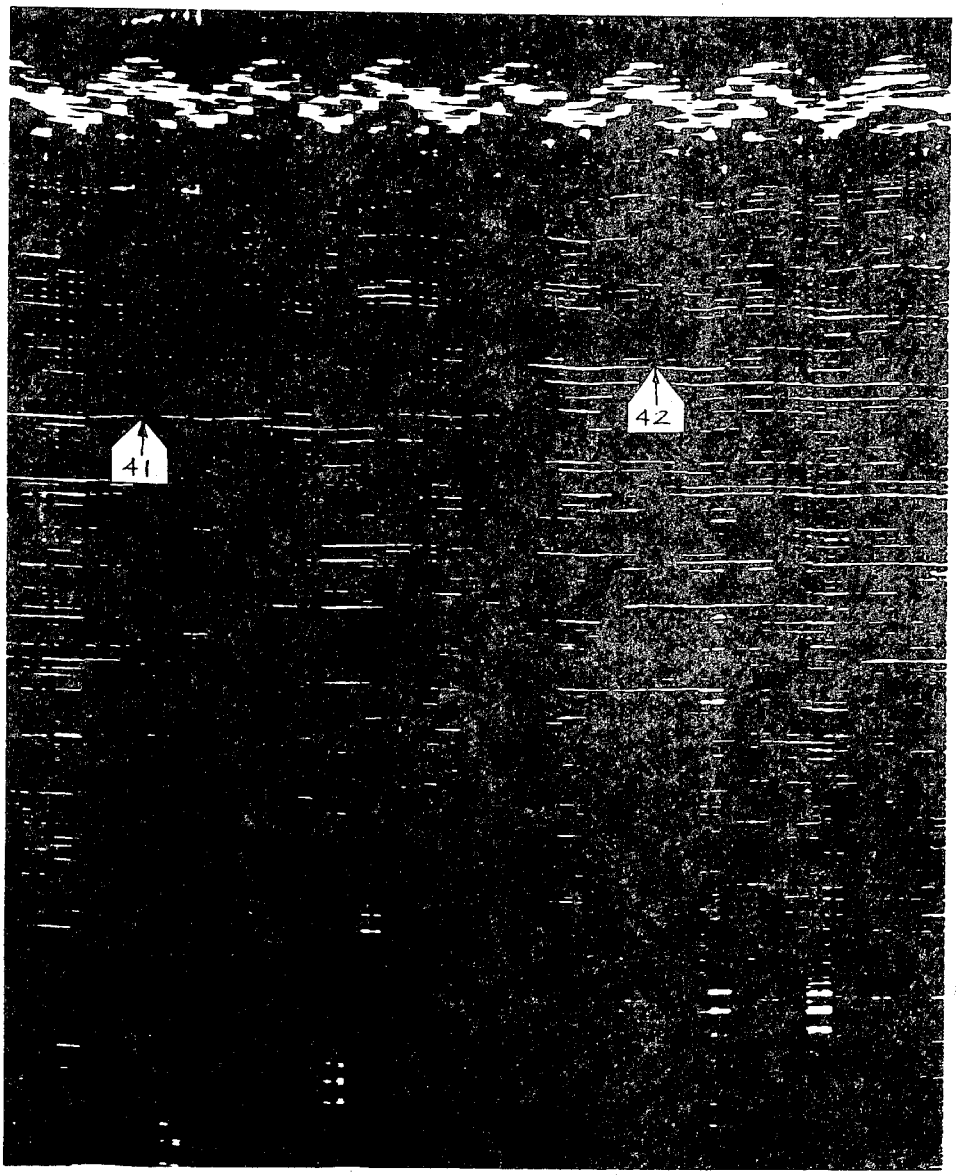
Fig. 3 is a composite variable density seismogram obtained from the seismogram of Fig. 2 according to this invention.

According to the present invention, the seismogram of Fig. 2 is photographically converted to the form shown in Fig. 3 to improve its clearness, continuity and sharpness. Although such conversion may be effected in many suitable ways, it will be described for purposes of illustration with regard to the apparatus arrangement shown in Fig. 4.

The composite seismogram of Fig. 2, indicated at 2 in Fig. 4, is mounted in a support frame or carriage 6 adapted to be propelled along tracks 7 by means such as a worm or lead screw 8, actuated by a suitable motor mechanism 9. The carriage 6 moves so as to displace the seismogram 2, in the direction of its plane, and also in a direction perpendicular to the seismic traces thereon, with regard to a camera or other recording apparatus 35. The motor mechanism 9 is energized from any desired source of electrical power through a control unit 36, whereby the extent or amplitude and the speed of the motion of the carriage 6 can be adjusted to a desired value. The control unit 36 may also serve to energize, for a desired predetermined time period, a light source 37 and/or the shutter of the recorder 35.

In operating the system of Fig. 4, a seismogram such as shown in Fig. 2 is placed in the frame 6 and is photographed while the frame 6 is automatically moved by the motor 9 through a distance necessary to give an overlap of one, two, three, four, or any other desired number of traces. That is, the seismogram of Fig. 2 is displaced in such a manner that, for example trace 11 of Fig. 2 is moved, during the period of photographing, to the position formerly occupied by trace 12 (single overlap), or the position formerly occupied by trace 13 (double overlap), or by trace 14 (triple overlap), etc. The resulting record is shown in Fig. 3 which is a single overlap photograph of the seismogram of Fig. 2. It will be seen that the process described above thus results in transforming the variable area seismogram of Fig. 2 into the variable density record of Fig. 3, wherein the black and white areas of Fig. 2 are blended into gray areas of variable darkness or density depending on the amount of the emulsion silver deposited on the film or paper by the light reflected thereon from the black or white areas of the variable area record during the motion of the latter in proportion to the relative size of said black and white areas.

It will also be seen that the record of Fig. 3 gives, on inspection, a much clearer and more satisfactory picture of the underground conditions than that obtainable from Fig. 2. Thus, layers such as indicated at 41 and 42 in Fig. 3 cannot escape the eye of a casual observer, whereas some study is required before these layers can be discerned in Fig. 2. Finally, the record of Fig. 3, being a variable density record, is susceptible, if desired, of further reconversion into electrical impulses for purposes of analysis or for producing further visual records by methods which are well known in sound recording and which form no part of the present invention.

I claim as my invention:

1. As a visual aid in seismic exploration, the method comprising the steps of consecutively obtaining along a predetermined survey line a plurality of variable area seismograms each formed so that the area to one side of the oscillatory line produced in response to ground waves is of a color contrasting with that of the area on the other side of said oscillatory line, arranging the seismograms side by side in a single plane in an order corresponding to that in which they were obtained along said survey line, moving said seismograms together in the plane in which they are arranged and at right angles to the lines thereon, and photographing said seismograms during said motion to obtain a variable density record giving a visual representation of the underground conditions in a vertical plane passing through the survey line.

2. As a visual aid in seismic exploration, the method comprising the steps of consecutively obtaining along a predetermined survey line a plurality of seismograms each comprising an oscillatory line representing the recorded ground waves, reducing the area to one side of said oscillatory line to black, reducing the area to the other side of said oscillatory line to white, arranging the seimograms side by side in a single plane in an order corresponding to that in which they were obtained along said survey line, moving said seismograms together in the plane in which they are arranged and at right angles to the lines thereon, and photographing said seismograms during said motion to obtain a variable density record giving a visual representation of the underground conditions in a vertical plane passing through the survey line.

3. As a visual aid in seismic exploration the method comprising the steps of disposing a spread of seismometers along a portion of a predetermined survey line, simultaneously recording the electric impulses produced by said seismometers in response to ground waves to obtain a seismogram comprising a plurality of variable area seismic tracks each formed so that the area to one side of the oscillatory line produced in response to ground waves is of a color contrasting with that of the area to the other side of said oscillatory line, transferring said seismometer spread to an adjacent portion of the survey line and obtaining another seismogram on the second location, repeating said operation a desired number of times along the survey line to obtain a desired number of seismograms, arranging the seismograms side by side in a single plane in an order corresponding to that in which they were obtained along said survey line, moving said seismograms together in the plane in which they are arranged and at right angles to the lines thereon, and photographing said seismograms during said motion to obtain a variable density record giving a visual representation of the underground conditions in a vertical plane passing through the survey line.

4. The method of claim 3, wherein the seismograms are moved while being photographed through a distance equal at least to that between two adjacent seismogram traces.

5. As a visual aid in seismic interpretation, the method comprising the steps of recording a plurality of contrast type seismic traces along a profiling survey line, arranging the seismic traces side by side in the order in which they were obtained along said survey line and photographing the seismic traces so arranged while moving said traces in a direction at right angles to their length to obtain a composite variable density seismogram giving a visual representation of the underground conditions in a vertical plane passing through said survey line.

References Cited in the file of this patent

UNITED STATES PATENTS

| 2,051,153 | Rieber | Aug. 18, 1936 |
| 2,539,220 | Athy et al. | Jan. 23, 1951 |
| 2,562,377 | Crane | July 31, 1951 |
| 2,604,955 | Hawkins | July 29, 1952 |